United States Patent
Dhar et al.

(10) Patent No.: US 8,767,751 B2
(45) Date of Patent: Jul. 1, 2014

(54) UNSOLICITED FIP PACKET INJECTION BY PROXY AND SPOOFING AND AUTOCONFIGURING INTERMEDIATE BRIDGES USING FIP SNOOPING

(75) Inventors: Sandeep Dhar, Karnataka (IN); Ganesan Rajagopal, Bangalore (IN); Smitha Narayanaswamy, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 12/771,834

(22) Filed: Apr. 30, 2010

(65) Prior Publication Data

US 2011/0268127 A1 Nov. 3, 2011

(51) Int. Cl.
*H04L 1/00* (2006.01)
*H04L 12/26* (2006.01)
*G01R 31/08* (2006.01)
*G06F 11/00* (2006.01)
*G08C 15/00* (2006.01)
*H04J 1/16* (2006.01)
*H04J 3/14* (2006.01)

(52) U.S. Cl.
USPC ............ 370/401; 370/216; 370/229; 370/254

(58) Field of Classification Search
None
See application file for complete search history.

(56) References Cited

U.S. PATENT DOCUMENTS

| | | | |
|---|---|---|---|
| 6,789,257 B1 * | 9/2004 | MacPhail | 719/316 |
| 2008/0162915 A1 * | 7/2008 | Price et al. | 713/2 |
| 2009/0245242 A1 * | 10/2009 | Carlson et al. | 370/386 |
| 2009/0292813 A1 * | 11/2009 | Snively et al. | 709/228 |
| 2010/0118735 A1 * | 5/2010 | Pandit | 370/254 |
| 2010/0232419 A1 * | 9/2010 | Rivers | 370/352 |
| 2011/0032933 A1 * | 2/2011 | Eisenhauer et al. | 370/389 |
| 2011/0176412 A1 * | 7/2011 | Stine et al. | 370/221 |

* cited by examiner

*Primary Examiner* — Hassan Phillips
*Assistant Examiner* — Lonnie Sweet
(74) *Attorney, Agent, or Firm* — Patterson & Sheridan, LLP (57) ABSTRACT

Methods and apparatus are provided for injecting Fiber Channel over Ethernet (FCoE) discovery packets, such as FCoE Initialization Protocol (FIP) or Data Center Bridge Exchange (DCBX) Protocol packets, by proxy or by spoofing into data center networks supporting FCoE in certain switchover, In-Service Software Upgrade (ISSU), and error scenarios. The transmission by proxy or by spoofing may occur at an intermediate FIP snooping bridge for communicating between FCoE devices. In this manner, the robustness of an FCoE path from one end of the data center network to another may be increased.

21 Claims, 4 Drawing Sheets

UNSOLICITED FIP PACKET INJECTION BY PROXY AND SPOOFING AND AUTOCONFIGURING INTERMEDIATE BRIDGES USING FIP SNOOPING

TECHNICAL FIELD

Embodiments of the present disclosure generally relate to network communications supporting Fibre Channel over Ethernet (FCoE) and, more particularly, to injecting FCoE Initialization Protocol (FIP) or Data Center Bridge Exchange (DCBX) Protocol packets by proxy or by spoofing.

BACKGROUND

Fibre Channel (FC) is a network technology primarily used for storage networking and running at gigabit speeds. FC is standardized in the T11 Technical Committee of the International Committee for Information Technology Standards (INCITS) and has become the standard connection type for storage area networks (SANs) in enterprise storage.

Fibre Channel over Ethernet (FCoE) is a mapping of FC frames natively over Ethernet, but is independent of the Ethernet forwarding scheme. This allows Fibre Channel to leverage 10 gigabit Ethernet networks while preserving the FC protocol, allowing a seamless integration with existing FC networks and management software. By preserving all FC constructs—maintaining the same latency, security, and traffic management attributes of FC while preserving investments in FC tools, training, and SANs, FCoE provides for I/O consolidation. FC is recognized as the dominant storage protocol in the data center, but the consolidation comes from using Ethernet to avoid creating another separate network.

The current proposal for FCoE, as defined by the INCITS T11 standards body, leverages a lossless Ethernet fabric, maintains the FC operational model, and includes a newly approved frame format. Of note, FCoE is not tied to 10 gigabit Ethernet (10GE) and will be able to run over networks with varying interface speeds.

Modern data centers use both Ethernet for Transmission Control Protocol/Internet Protocol (TCP/IP) networks and FC for SANs, each dedicated to specific purposes. Ethernet networks are typically implemented when end-users need to transfer relatively small amounts of information over both local and global distances or in clustered, low-latency computer environments. SANs are generally utilized when access to block I/O for applications such as booting over SANs, mail servers, file servers, and large databases are required. Deploying SANs has a number of benefits including: (1) centralized management, security, and administration of the storage resources, (2) uniform delivery of storage services such as periodic backups, and (3) running efficient utilization levels of storage resources.

OVERVIEW

Embodiments of the present disclosure generally relate to using intermediate FCoE Initialization Protocol (FIP) snooping bridges to inject FCoE discovery packets, such as FIP or Data Center Bridge Exchange (DCBX) Protocol packets, by proxy or by spoofing into a data center environment with FCoE devices, such as FCoE forwarders (FCFs) and ENodes.

One embodiment of the present disclosure provides a method of FCoE communication. The method generally includes establishing a link between first and second FCoE devices; generating, at a bridge for communicating between the two FCoE devices, a FCoE discovery packet, wherein the generated FCoE discovery packet is not based on a FCoE discovery packet received by the bridge; and transmitting the generated FCoE discovery packet to the first FCoE device using the established link. For some embodiments, the FCoE discovery packet typically includes an FIP packet. For other embodiments, the FCoE discovery packet typically includes a DCBX Protocol packet.

Another embodiment of the present disclosure provides an apparatus for FCoE communication. The apparatus generally includes logic configured to establish a link between first and second FCoE devices, to generate a FCoE discovery packet, wherein the generated FCoE discovery packet is not based on a FCoE discovery packet received by the apparatus, and to transmit the generated FCoE discovery packet to the first FCoE device using the established link.

Yet another embodiment of the present disclosure provides an apparatus for FCoE communication. The apparatus generally includes means for establishing a link between first and second FCoE devices, means for generating a FCoE discovery packet, wherein the generated FCoE discovery packet is not based on a FCoE discovery packet received by the apparatus, and means for transmitting the generated FCoE discovery packet to the first FCoE device using the established link.

Yet another embodiment of the present disclosure provides a system for FCoE communication. The system generally includes first and second FCoE devices and a network bridge. The network bridge typically includes logic configured to establish a link between the first and second FCoE devices, to generate a FCoE discovery packet, wherein the generated FCoE discovery packet is not based on a FCoE discovery packet received by the bridge, and to transmit the generated FCoE discovery packet to the first FCoE device using the established link.

Yet another embodiment of the present disclosure provides a method. The method generally includes performing FIP snooping, at a network bridge between two FCoE devices, to learn information about a topology of a FCoE virtual local area network (VLAN) associated with the two FCoE devices and automatically configuring the network bridge based on the information about the topology of the FCoE VLAN.

Yet another embodiment of the present disclosure provides an apparatus for FCoE communication. The apparatus generally includes logic configured to perform FIP snooping to learn information about a topology of a FCoE VLAN and to automatically configure the apparatus based on the information about the topology of the FCoE VLAN.

Yet another embodiment of the present disclosure provides a system for FCoE communication. The system generally includes two FCoE devices and a network bridge. The network bridge typically includes logic configured to perform FIP snooping to learn information about a topology of a FCoE VLAN associated with the two FCoE devices and to automatically configure the network bridge based on the information about the topology of the FCoE VLAN.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure provide methods and apparatus for injecting Fibre Channel over Ethernet (FCoE) discovery packets, such as FCoE Initialization Protocol (FIP) or Data Center Bridge Exchange (DCBX) Protocol packets, by proxy or by spoofing into data center networks supporting FCoE in certain switchover, In-Service Software Upgrade (ISSU), and error scenarios. The transmission by proxy or by spoofing may occur at an intermediate FIP snooping bridge for communicating between FCoE devices. In this manner, the robustness of an FCoE path from one end of the data center network to another may be increased.

An Example Data Center Network

Figure 1:
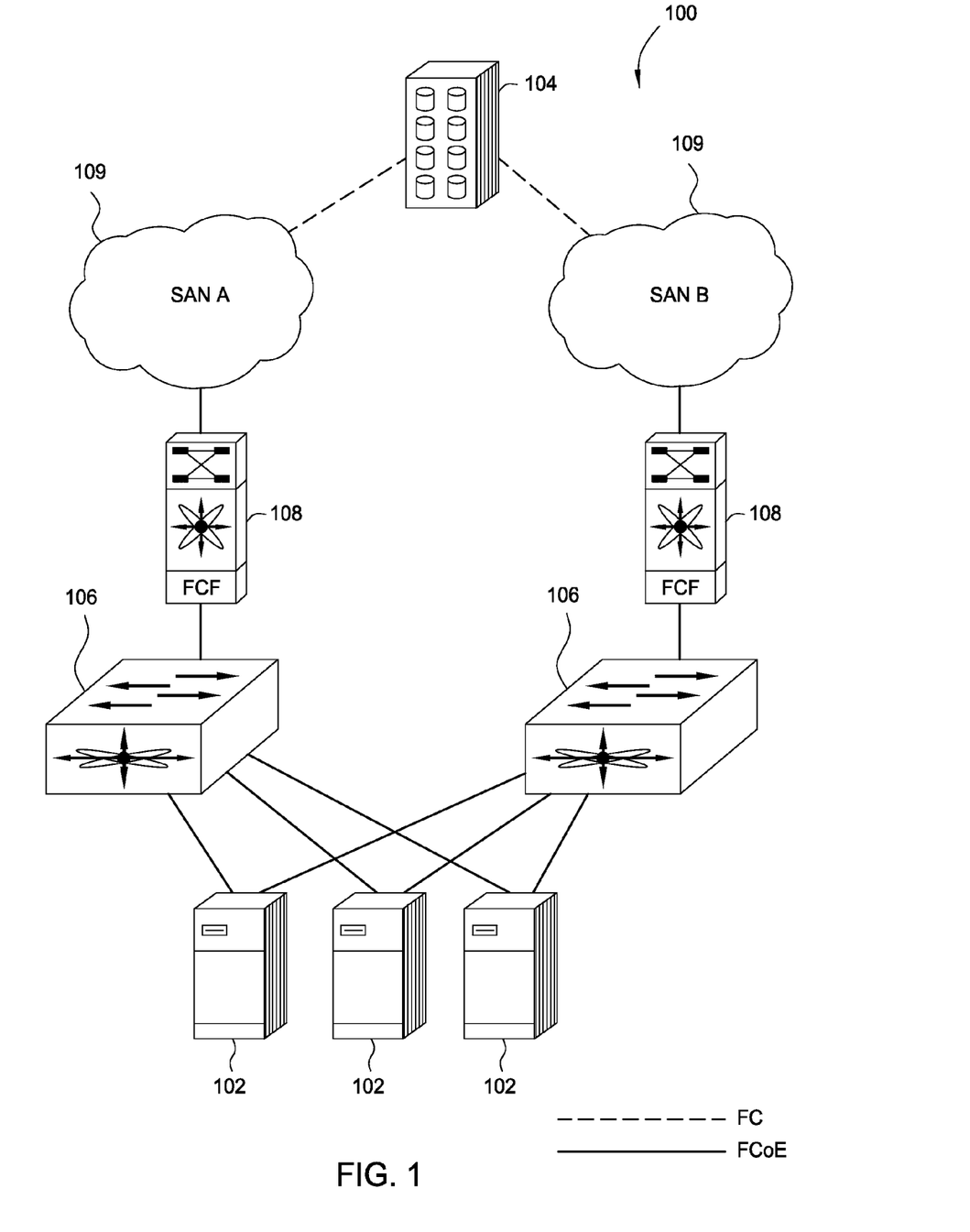
FIG. 1 illustrates an example data center network supporting Fibre Channel over Ethernet (FCoE), in accordance with an embodiment of the present disclosure.

FIG. 1 illustrates an example data center network 100 supporting FCoE with redundant connectivity, in accordance with an embodiment of the present disclosure. This infrastructure may be well-suited to storage communications, and therefore, may be implemented in a storage area network (SAN), for example. A fabric is similar in concept to a network segment in a local area network (LAN), and a typical FCoE SAN fabric may comprise a number of FCoE-enabled switches. These FCoE-enabled switches may be used to allow a host 102 to access a server 104, which may store a large amount of data in one or more various forms (e.g., one or more databases).

One or more hosts 102 may interface with the SAN via two switches, one for each fabric in the data center network 100, at the access layer. The two access layer switches may comprise intermediate FCoE Initialization Protocol (FIP) snooping bridges 106. For some embodiments, the access layer switches may comprise Nexus 5000 series switches supporting FIP snooping available from Cisco Systems, Inc.

In the data center network 100 of FIG. 1, a core layer is depicted above the access layer. The core layer in storage area networks is analogous to the distribution layer in Ethernet architectures. The core layer may comprise various FCoE core switches 108, each with an FCoE forwarder (FCF) for fabric login and address assignment as described in greater detail below. Devices may be logged into only one FCF per fabric. In the event of an FCF failure, all devices that were logged into that FCF may most likely need to re-login to the fabric through another FCF. For some embodiments, the core switches 108 may comprise Nexus 7000 series switches available from Cisco Systems, Inc.

The core switches 108 of a fabric may be linked to one or more switches at the edge layer of the data center network 100 via different SAN clouds 109 (e.g., SAN A and SAN B as illustrated). The edge layer switches (not shown) may reside within the SAN clouds 109 and may interface with the server 104 via native Fibre Channel (FC) as illustrated in FIG. 1. For some embodiments, the edge layer switches may comprise MDS 9000 series multilayer switches from Cisco Systems, Inc.

In native FC, access layer switches control the logins of locally attached devices. Initiators and targets login to the Domain and Name servers in FC networks to receive their Fibre Channel ID (FCID) in order to begin communicating on the fabric. The failure domain is only as large as the number of devices locally connected to that switch or director. This failure domain may be increased with the use of N Port Virtualization/N Port ID Virtualization (NPV/NPIV) enabled switches.

In an FCoE environment on the other hand, the fabric login process is typically controlled by the FCF. FIP handles the communication from ENodes (FC Nodes, such as a host or a server, with one or more lossless Ethernet media access control (MAC) addresses, each coupled with an FCoE controller) to FCFs for fabric login and address assignment. As the FCoE control protocol, FIP is responsible for establishing and maintaining Fibre Channel virtual links between pairs of FCoE devices (ENodes and FCFs). During the virtual link establishment phase, FIP may first discover FCoE Virtual Local Area Networks (VLANs) and remote virtual FC interfaces. Then, FIP may perform virtual link initialization functions (fabric login [FLOGI] and fabric discovery [FDISC], or exchange link parameters [ELP]) similar to their native FC equivalents. With FIP, an ENode, such as the host 102, may determine all the available FCFs and then select a particular FCF for the fabric login. After the ENode has discovered all FCFs and selected one for login, the last step may be to inform the selected FCF of the intention to create a virtual link with its VF_Port.

After the virtual link is established, FC payloads (encapsulated in FCoE frames) may be exchanged on the virtual link, and FIP may remain in the background to perform virtual link maintenance functions. For example, FIP may continuously verify reachability between the two virtual FC interfaces on the Ethernet network, and FIP may offer primitives to delete the virtual link in response to administrative actions to that effect.

Furthermore, FIP has been designed to enable network bridges to efficiently monitor FIP frames passing through them using a mechanism known as FIP snooping. By snooping on FIP packets during the discovery and login phases, intermediate bridges can implement dynamic data integrity mechanisms using access control lists (ACLS) that permit valid FCoE traffic between the ENode and the FCF. Implementing such security mechanisms may ensure that only valid FCoE traffic is allowed. An intermediate bridge implementing the above functionality may be referred to as an intermediate FIP snooping bridge 106, as illustrated in FIG. 1.

FIP snooping may involve using Data Center Bridge Exchange (DCBX) Protocol to negotiate the FCoE parameters so that the FCoE cloud has end-to-end autoconfiguration for FCoE infrastructure and features. DCBX Protocol uses the standard Link Level Discovery Protocol (LLDP) IEEE standard 802.1ab-2005 to create a bidirectional negotiation path between peer nodes to push the FCoE configuration so that the FCoE cloud is consistent end-to-end.

Figure 2A:
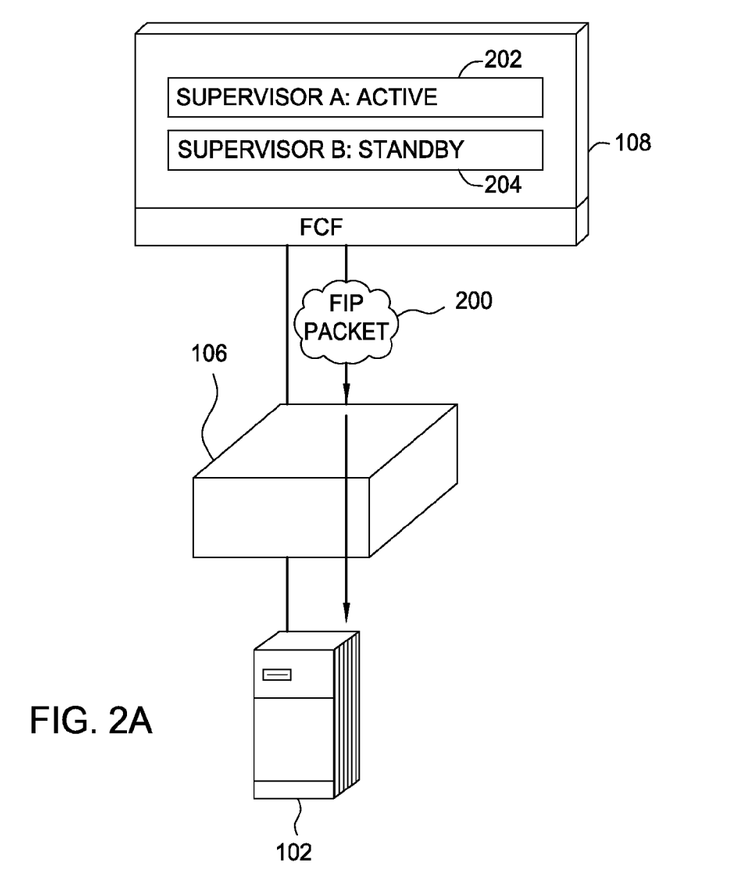
FIG. 2A illustrates an intermediate FIP snooping bridge relaying a FIP packet between a FCoE core switch and a host of a data center network, in accordance with an embodiment of the present disclosure.

Referring now to FIG. 2A, an intermediate FIP snooping bridge 106 may snoop FIP sessions used for maintaining a previously established virtual link between a host 102 and a core switch 108 with a FCF. Conventionally, the intermediate bridge 106 may simply relay an FIP packet 200 between the FCF and the host 102. However, in certain situations, the robustness of the FCoE path from one end of the data center network to the other may suffer when the intermediate bridge 106 is limited to simply relaying an FIP or DCBX Protocol packet.

For example, the core switch 108 with the FCF may comprise two supervisors, Supervisor A 202 and Supervisor B 204 as depicted in FIG. 2A. Supervisor A 202 may be in the Active state, while Supervisor B 204 may be in the Standby state. During a supervisor switchover or an In-Service Software Upgrade (ISSU), both supervisors may temporarily be in the Standby state and, hence, the FIP session may be temporarily interrupted. During this FIP session interruption, FIP packets may no longer be transmitted between the FCF and the host 102. If the interruption lasts long enough (e.g., longer than an advertised timeout value), the FIP session may timeout, and the virtual link may be terminated, destroying the integrity of the FCoE path from one end of the data center network to the other. Besides dual supervisor switchovers and ISSU, other situations where the robustness of the end-to-end FCoE path may suffer include single supervisor switchovers and ISSU, linecard switchovers, loss of session databases, and some error conditions.

Accordingly, what are needed are techniques and apparatus for increasing the robustness of an end-to-end FCoE path during the exchange of FIP or DCBX Protocol packets.

An Example FIP or DCBX Protocol Packet Injection

Figure 3:
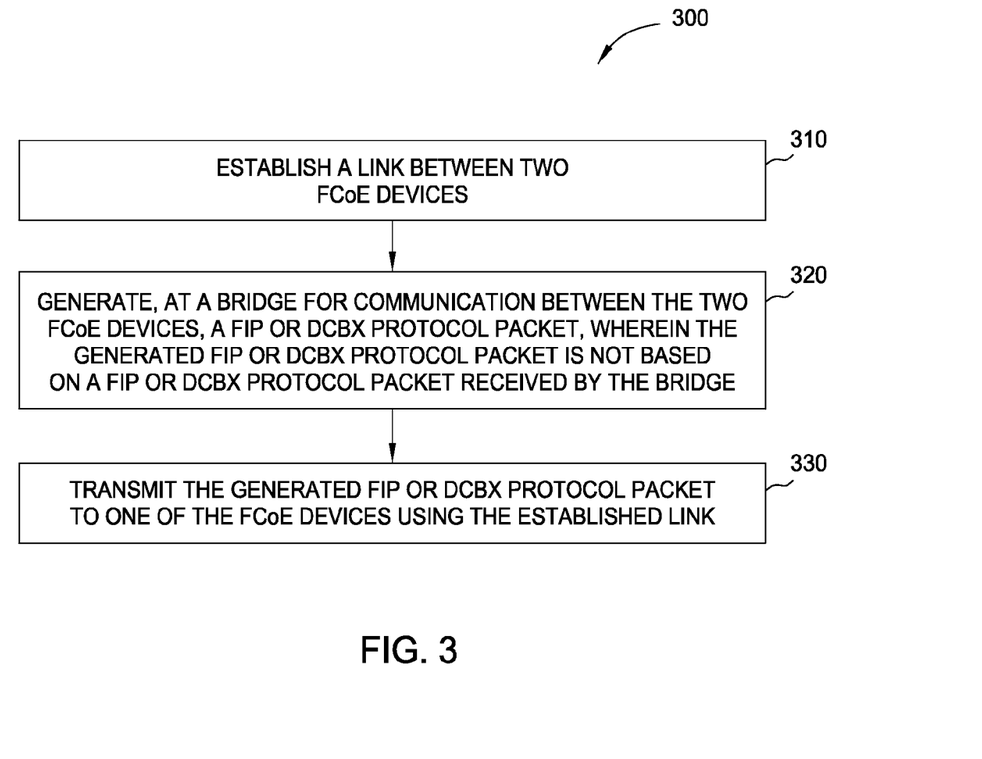
FIG. 3 illustrates example operations for injecting FIP or DCBX Protocol packets by proxy or by spoofing into a data center network in an effort to make the end-to-end FCoE path more robust in certain situations, in accordance with an embodiment of the present disclosure.

To increase the reliability, serviceability, and maintainability of an end-to-end FCoE path, FIG. 3 illustrates example operations 300 for injecting FCoE discovery packets, such as FIP or DCBX Protocol packets, by proxy or by spoofing into a data center network. The operations 300 may begin, at 310, by establishing a link (e.g., a virtual link) between two FCoE devices, such as an ENode (e.g., a host 102) and a FCF. The establishment of the link may comprise discovery and fabric login using FIP as described above.

At 320, a network bridge (e.g., an intermediate FIP snooping bridge 106) for communicating between the two FCoE devices may generate a FIP or DCBX Protocol packet. The generated FIP or DCBX Protocol packet, in this case, is not simply a relayed packet and, thus, is not based on a FIP or DCBX Protocol packet received by the bridge from an FCoE device.

At 330, the bridge may transmit the generated FIP or DCBX Protocol packet to one of the FCoE devices using the established link. In other words, the FIP or DCBX Protocol packet transmitted at 330 is not transmitted during discovery or fabric login; rather, this packet may be transmitted during virtual link maintenance. The generation and transmission of the FIP or DCBX Protocol packet may comprise injecting said packet into the data center network by spoofing or by proxy. As an example, spoofing may be used when the bridge generates and transmits a fake FIP or DCBX Protocol packet in an effort to keep a session active and prevent a timeout. In contrast, transmission by proxy may be employed by the bridge to generate and transmit a FIP or DCBX Protocol packet in place of a FIP or DCBX Protocol packet generated by and expected from the FCF or the ENode, perhaps when the FCF or the ENode is unavailable to transmit this expected packet, due to a switchover or an ISSU, for example.

Figure 2B:
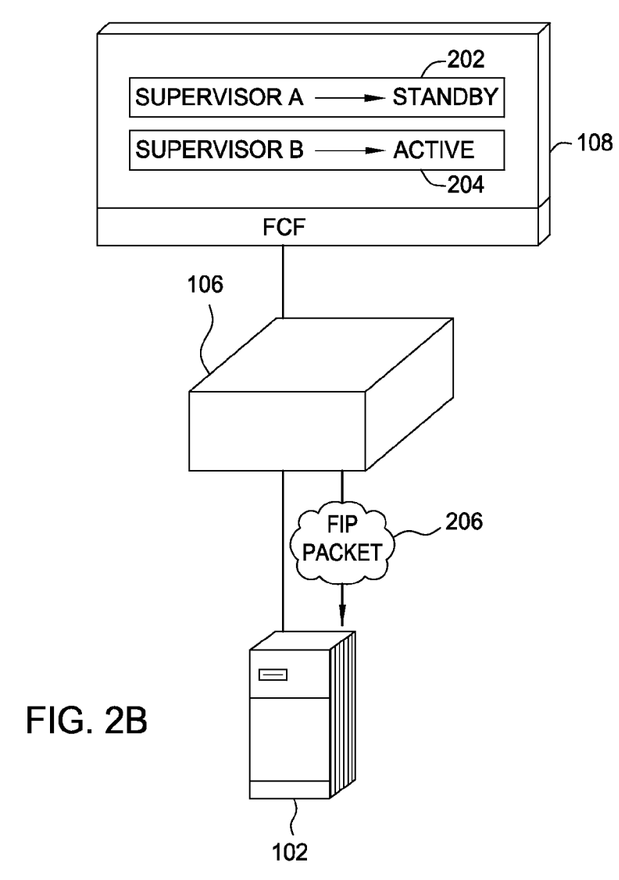
FIG. 2B illustrates the intermediate FIP snooping bridge injecting a FIP packet into the data center network by proxy (or by spoofing), in accordance with an embodiment of the present disclosure.

For example, FIG. 2B illustrates a situation where the supervisors 202, 204 in the core switch 108 with the FCF from FIG. 2A are performing a switchover or an ISSU, such that Supervisor A 202 is entering the Standby state and Supervisor B 204 is entering the Active state. During this switchover, the FCF may not be available to send an FIP packet, such as the expected FIP packet 200. Without any user intervention, the intermediate FIP snooping bridge 106 may generate and transmit by proxy an FIP packet 206 to the host 102. In this manner, the robustness of the end-to-end FCoE path may be maintained.

In other situations (e.g., a loss of a session database, an error condition, or a link failure), the intermediate FIP snooping bridge 106 may spoof the FIP packet 206 in an effort to keep the FIP session active and prevent a timeout. Injecting a FIP or DCBX Protocol packet by spoofing or by proxy into the data center network during these situations may increase the reliability, serviceability, and maintainability of an FCoE path.

Various types of FIP or DCBX Protocol packets may be suitable for transmission by proxy or by spoofing according to embodiments of the disclosure. These FIP or DCBX Protocol packets may include a FIP Clear Virtual Link message, a FIP Keep Alive message, various settings (e.g., timeouts), information for VLAN discovery (e.g., a FIP VLAN Discovery message), requests to the FCF, and session-related control packets to check whether sessions are really active. DCBX Protocol packets may also be indicated when the switch runtime database is unavailable.

Example FCoE Autoconfiguration of Intermediate Bridges

Depending on the topology, a data center environment, such as the data center network 100 of FIG. 1, may include a great number of intermediate network bridges between an ENode (e.g., a host 102) and a FCF. These intermediate network bridges may comprise FIP snooping bridges 106 (as illustrated in FIG. 1), blade switches, and the like. Conventionally, a network operator has to manually configure all the intermediate bridges, providing the bridges with FCoE VLANs and other information. Such manual configuration may prove to be operationally prohibitive, especially when the operating expense (OpEx) becomes excessive due to the large number of intermediate bridges in the data center network.

Accordingly, what are needed are techniques and apparatus for configuring numerous intermediate bridges without a prohibitive configuration expense.

Figure 4:
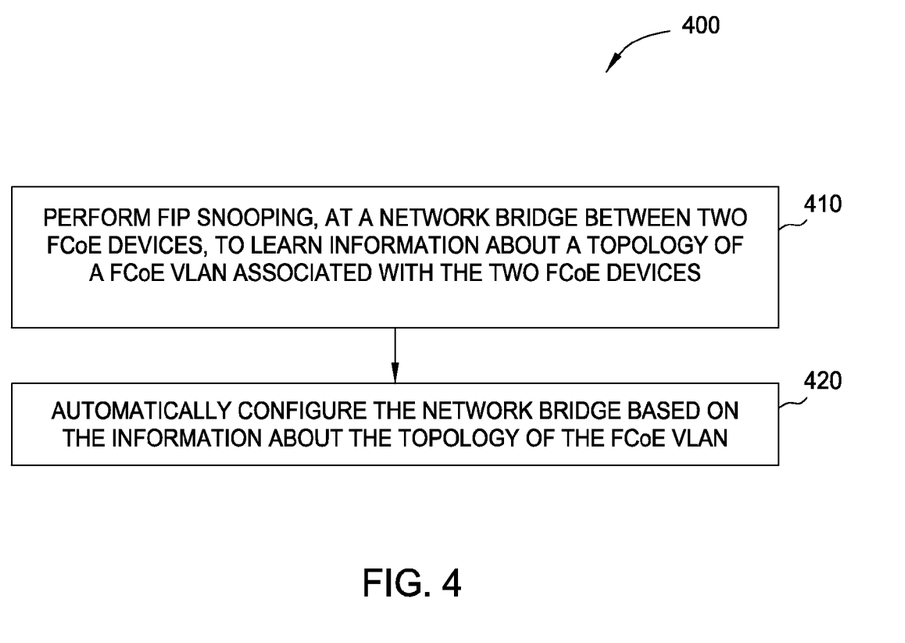
FIG. 4 illustrates example operations for using FIP snooping to automatically configure an intermediate network bridge, in accordance with an embodiment of the present disclosure.

FIG. 4 illustrates example operations 400 for using FIP snooping to automatically configure an intermediate network bridge. The operations 400 may begin, at 410, by performing FIP snooping, at a network bridge between two FCoE devices, to learn information about a topology of a FCoE VLAN associated with the two FCoE devices. One of the FCoE devices may comprise an ENode, while the other FCoE device may comprise a FCF. The intermediate bridge may snoop the FIP packets between the two FCoE devices to discover the FCoE VLANs on the FCF.

At 420, the network bridge may be automatically configured based on the information about the topology of the FCoE VLAN. When an ENode (e.g., a host 102) tries to login to the fabric using a VLAN, the intermediate bridge may automatically add that VLAN on the respective trunks and keep track of that VLAN. In other words, the intermediate bridge may automatically determine what is connected to an interface (e.g., a port) of the bridge. However, when a session times out, the automatically configured VLAN associated with that session may most likely be deleted by the intermediate bridge. For some embodiments, this deletion may occur an appropriate n*KeepAlive interval after the session times out.

By using FIP snooping on all the ports of the intermediate bridge (or at least all the ports connected with an FCoE device), the intermediate bridge may keep track of all the FCoE VLANs and thereby effectively create a topology map. In this manner, the intermediate bridge may optimize a multicast to All-FCF-MACS, a multicast media access control (MAC) address to which all FCFs listen, and/or to All-ENode-MACS, a multicast MAC address to which all ENodes listen. Eventually, the intermediate bridge may learn where all the FCFs are connected, as well as the FCoE MAC address prefix (FC-MAP)/(v) SAN association with the VLANs. This may allow the intermediate bridge to come up in an autoconfiguration plug-N-play mode, the bridge needing no manual configuration to work in a data center network and support FCoE. With such automatic configuration, the operating expense (OpEx) of manually configuring potentially thousands of intermediate bridges may be saved.

Furthermore, the intermediate bridge may push quality of service (QoS) information for FCoE and/or other parameters learned from a FCF to an ENode, such as a host 102. The QoS information may include, for example, "no drop" virtual link (no-drop VL) and/or Enhanced Transmission Selection (ETS)/bandwidth grouping for FCoE traffic. The DCBX Protocol typically contains type-length-value (TLV) elements, in which the QoS information—including class of service (CoS) information for applications such as FCoE where a no-drop CoS is desired—may be encoded.

For this distribution of QoS information and other parameters, the intermediate bridge may assume various DCBX Protocol roles depending on where the bridge is connected. In other words, on ports of the intermediate bridge connected with the FCF, the bridge may assume a "willing" role, whereas on ports connected with hosts (i.e., host-facing ports), the bridge may assume a "not-willing" role. Using DCBX Protocol packets, the FCF may be detected. Then, the QoS and FCoE parameters may be imported by the intermediate bridge's "willing" ports and pushed towards the hosts, forcing them to accept the QoS and FCoE parameters, thereby propagating these parameters from the FCF to each host in the network. In this manner, an intermediate network bridge may be brought up right out of the box supporting FCoE with hardly any user configuration, potentially saving the network operator from having to configure up to thousands of blade switches, top-of-rack (ToR) switches, or FIP snooping bridges in a data center environment supporting FCoE.

While the foregoing is directed to embodiments of the present disclosure, other and further embodiments of the disclosure may be devised without departing from the basic scope thereof, and the scope thereof is determined by the claims that follow.

The invention claimed is:

1. A computer-implemented method to facilitate reliability of Fibre Channel over Ethernet (FCoE) communication paths during session interruptions, the computer-implemented method comprising:
   establishing a link of a FCoE communication path between first and second FCoE devices, wherein establishing the link comprises performing discovery of and fabric login to at least one of the FCoE devices, wherein the link is maintainable by a session;
   during interruption of the session, generating, a FCoE discovery packet at a network bridge for communicating between the FCoE devices, wherein the generated FCoE discovery packet is not based on any FCoE discovery packet received by the network bridge; and
   after the discovery and the fabric login, transmitting the generated FCoE discovery packet to the first FCoE device using the established link, wherein the FCoE discovery packet is generated and transmitted without requiring user intervention and in order to keep the session active, thereby preventing the interrupted session from timing out and causing termination of the link.

2. The computer-implemented method of claim 1, wherein the FCoE discovery packet comprises a FCoE Initialization Protocol (FIP) or Data Center Bridge Exchange (DCBX) Protocol packet.

3. The computer-implemented method of claim 1, wherein generating and transmitting the FCoE discovery packet comprises spoofing the FCoE discovery packet to keep the session active.

4. The computer-implemented method of claim 1, wherein generating and transmitting the FCoE discovery packet comprises transmitting the FCoE discovery packet by proxy for the second FCoE device.

5. The computer-implemented method of claim 1, thereby facilitating reliability of the FCoE communication path despite the interrupted session, wherein robustness, serviceability, and maintainability of the FCoE communication path are thereby also maintained, wherein the generated FCoE discovery packet is a spoofed keepalive FCoE discovery packet and is not a relayed packet, wherein the interrupted session timing out comprises the session being interrupted for longer than an advertised timeout value.

6. The computer-implemented method of claim 5, wherein the link comprises a virtual link, wherein the session comprises a FCoE Initialization Protocol (FIP) session, wherein the generated FCoE discovery packet is transmitted during maintenance of the virtual link, wherein the first FCoE device comprises a core switch that includes a FCoE forwarder (FCF), wherein the second FCoE device comprises an Fibre Channel (FC) Node, wherein the FC Node comprises, in respective instances, a host and a server, wherein no FIP packets are otherwise transmittable between the FCF and the host during the interruption of the session, wherein FIP packets are transmittable between the FCF and the host when the session is not interrupted.

7. The computer-implemented method of claim 6, wherein the generated FCoE discovery packet comprises, in respective instances: (i) a FIP Clear Virtual Link message; (ii) a FIP Keep Alive message; (iii) a FIP Virtual Local Area Network (VLAN) Discovery message; (iv) FCF request; (v) a session-related control packet to determine if a session is active; and (vi) a Data Center Bridge Exchange (DCBX) Protocol packet; wherein reliability of the FCoE communication path is improved relative to limiting the bridge to relaying only FIP or DCBX Protocol packets, wherein the generated FCoE discovery packet is, in respective instances:
   (i) transmitted during a situation in which a FCoE discovery packet will not reach the network bridge; and
   (ii) transmitted during a situation in which a FCoE discovery packet will not be transmitted to the network bridge.

8. The computer-implemented method of claim 7, wherein the second FCoE device comprises at least one supervisor, wherein the situation comprises an In-Service Software Upgrade (ISSU) of the at least one supervisor, wherein the second FCoE device comprises, in respective instances: (i) two or more supervisors including the at least one supervisor and (ii) two or more linecards; wherein the situation comprises, in respective instances: (i) a switchover between the supervisors; (ii) a switchover between the linecards; (iii) a switch runtime database being unavailable; (iv) an In-Service Software Upgrade (ISSU) taking place; and (v) occurrence of a predefined error condition.

9. The computer-implemented method of claim 8, wherein the situation causes the interruption of the session, wherein the situation comprises, in respective instances: (i) an error condition at the second FCoE device and (ii) a link failure of the established link between the network bridge and the second FCoE device; wherein generating and transmitting the FCoE discovery packet without requiring user intervention comprises, in respective instances: (i) spoofing the FCoE discovery packet to keep the session active and (ii) transmitting the FCoE discovery packet by proxy for the second FCoE device.

10. The computer-implemented method of claim 9, wherein establishing the link in a first instance comprises performing discovery of and fabric login to the at least one of the FCoE devices, wherein establishing the link in a second instance comprises exchanging link parameters; wherein the network bridge comprises an FIP snooping bridge configured to, without requiring user intervention, perform unsolicited FIP packet injection based on proxy or spoofing, wherein the FIP snooping bridge is further configured to autoconfigure a plurality of intermediate network bridges of a network fabric, based on FIP snooping and without requiring user intervention, by:
learning information about a topology of a FCoE VLAN associated with the FCF and the host, by snooping FIP packets between the FCF and the host in order to discover a plurality of FCoE VLANs on the FCF, the plurality of FCoE VLANs including the FCoE VLAN.

11. The computer-implemented method of claim 10, wherein an operating expense associated with configuring the plurality of intermediate network bridges is thereby reduced, wherein an intermediate network bridge of the plurality of intermediate network bridges is configured to, without requiring user intervention and upon the host attempting to login to the network fabric using the FCoE VLAN, add the FCoE VLAN on one or more respective trunks and monitor the added FCoE VLAN, in order to determine what is connected to an interface of the intermediate network bridge;
wherein the interface comprises a network port of a plurality of network ports of the intermediate network bridge, wherein the intermediate network bridge is further configured to delete the added FCoE VLAN upon an interval elapsing subsequent to a session timeout, wherein the interval is a function comprising a predefined multiple of a keepalive interval.

12. The computer-implemented method of claim 11, wherein the intermediate network bridge is configured to generate a topology map by monitoring FCoE VLANs based on FIP snooping on each network port of the intermediate network bridge, in order to optimize a multicast to a multicast media access control (MAC) address to which all devices of a predefined type listen, wherein all devices of the predefined type consists of, in respective instances: (i) all FCFs and (ii) all ENodes; wherein the intermediate network bridge thereby learns: (i) where all devices of the predefined type are connected and (ii) FCoE MAC address prefix (FC-MAP)-Virtual Storage Area Network (VSAN) association with the FCoE VLANs; in order to operate in an autoconfiguration plug-and-play mode.

13. The computer-implemented method of claim 12, wherein the intermediate network bridge is further configured to distribute information to the host, wherein the information comprises, in respective instances: (i) quality of service (QoS) information for FCoE and (ii) other parameters learned from the FCF; wherein the QoS information includes no-drop virtual link information and Enhanced Transmission Selection (ETS) bandwidth grouping information for FCoE traffic, wherein the DCBX Protocol specifies type-length-value (TLV) elements, in which QoS information is encoded, wherein the encoded QoS information includes class of service (CoS) information for a predefined application, wherein the predefined application comprises FCoE in which a no-drop CoS is desired.

14. The computer-implemented method of claim 13, wherein the intermediate network bridge, in distributing the information, is configured to assume one of a plurality of distinct DCBX Protocol roles, based on where the bridge is connected, wherein the plurality of DCBX Protocol roles include a willing role and a unwilling role, wherein the intermediate network bridge assumes the willing role for a first subset of ports connected with the FCF, wherein the intermediate network bridge assumes the unwilling role for a second subset of ports connected with the host, wherein the first and second subsets of ports are disjoint.

15. The computer-implemented method of claim 14, wherein the intermediate network bridge is further configured to detect the FCF based on DCBX Protocol packets, whereafter QoS and FCoE parameters are imported via the first subset of ports of the intermediate network bridge and distributed to a plurality of hosts including the host, in order to force the hosts to accept the QoS and FCoE parameters, whereby the QoS and FCoE parameters are propagated to each host in the network fabric, thereby reducing an operating expense associated with configuring blade switches, top-of-rack switches, and FIP snooping bridges in a data center environment configured to support FCoE.

16. An apparatus to facilitate reliability of Fibre Channel over Ethernet (FCoE) communication paths during session interruptions, the apparatus comprising:
logic configured to:
establish a link of a FCoE communication path between first and second FCoE devices by performing discovery of and fabric login to at least one of the FCoE devices;
generate a FCoE discovery packet, wherein the link is maintainable by a session, wherein the generated FCoE discovery packet is not based on a FCoE discovery packet received by the apparatus; and
transmit the generated FCoE discovery packet to the first FCoE device using the established link, after the discovery and the fabric login, wherein the FCoE discovery packet is generated and transmitted without requiring user intervention and in order to keep the session active, thereby preventing the interrupted session from timing out and causing termination of the link.

17. The apparatus of claim 16, wherein the logic is configured to generate and transmit the FCoE discovery packet by spoofing the FCoE discovery packet to keep the session active.

18. The apparatus of claim 16, wherein the logic is configured to generate and transmit the FCoE discovery packet by transmitting the FCoE discovery packet by proxy for the second FCoE device.

19. An apparatus to facilitate reliability of Fibre Channel over Ethernet (FCoE) communication paths during session interruptions, the apparatus comprising:
means for establishing a link of a FCoE communication path between first and second FCoE devices, wherein establishing the link comprises performing discovery of and fabric login to at least one of the FCoE devices, wherein the link is maintainable by a session;

means for generating, during interruption of the session, a FCoE discovery packet, wherein the generated FCoE discovery packet is not based on any FCoE discovery packet received by the apparatus; and means for transmitting, after the discovery and the fabric login, the generated FCoE discovery packet to the first FCoE device using the established link, wherein the FCoE discovery packet is generated and transmitted without requiring user intervention and in order to keep the session active, thereby preventing the interrupted session from timing out and causing termination of the link.

20. The apparatus of claim 19, wherein the means for generating is configured to generate the FCoE discovery packet by spoofing the FCoE discovery packet to keep the session active.

21. The apparatus of claim 19, wherein the means for transmitting is configured to transmit the FCoE discovery packet by proxy for the second FCoE device.

* * * * *